United States Patent

[11] 3,573,345

[72] Inventors Donald H. Devries
Mesa;
Thomas D. Umphrey, Chandler, Ariz.

[21] Appl. No. 827,230
[22] Filed May 23, 1969
[45] Patented Apr. 6, 1971
[73] Assignee Rogers Corporation
Rogers, Conn.

[54] CONNECTION OF FLEXIBLE PRINTED CIRCUIT TO CONNECTOR BOARD AND METHOD OF MAKING SAME
10 Claims, 7 Drawing Figs.

[52] U.S. Cl. .......... 174/68.5, 29/628, 174/135, 339/17, 339/103
[51] Int. Cl. .......... H05k 1/10
[50] Field of Search .......... 174/68.5, 135; 317/101 (B), 101 (C); 339/17, 275 (B), 103; 29/625, 628

[56] References Cited

OTHER REFERENCES

Smith et al. " Making the Most of Flat Cables" pub. Oct. 14, 1959, Electronic Design, pp. 56— 59. (TK7800 .E51) Copy in the Scientific Library and Group 215, Class 174-68.5

*Primary Examiner*—Darrell L. Clay
*Attorney*—Fishman and Van Kirk

ABSTRACT: A terminated multiconductor flat flexible printed circuit cable and its production are disclosed. The insulation is stripped from one side of one end of the cable to expose portions of the conductors, the cable is folded back on itself intermediate the exposed conductor portions, the cable is adhesively bonded to a connector board with the exposed conductors in registration with the connector terminations and the folded conductor portions are passed through a wave of solder.

PATENTED APR 6 1971 3,573,345

INVENTORS
DONALD H. DeVRIES
THOMAS D. UMPHREY

BY

*FISHMAN & VAN KIRK*
ATTORNEYS

CONNECTION OF FLEXIBLE PRINTED CIRCUIT TO CONNECTOR BOARD AND METHOD OF MAKING SAME

BACKGROUND OF THE INVENTION

1. Field of the Invention

The present invention relates to printed circuits and specifically to flat flexible cables of the printed circuit type. More particularly, the present invention relates to the connection of flat flexible cables to connector boards. Accordingly, the general objects of the present invention are to provide novel and improved methods and apparatus of such character.

2. Description of the Prior Art

In the prior art, considerable difficulty has been experienced in economically and reliably joining multiconductor flexible cables to terminal boards and the like. Thus, the typical prior art technique for joining a multiconductor cable, the cable comprising copper foil conductors laminated between or coated on both sides with a continuous insulating film, to a connector board having a number of terminal pads commensurate with the number of conductors in the cable comprises soldering. However, in order to effect the soldering, it is first necessary to remove a strip of insulation from one side of one end of the flexible cable to thereby expose all of the conductors. Thereafter, the exposed conductors are coated with solder, the solder coating being approximately .0005 inch thick. The mating area or terminals on the connector board is also solder coated to approximately the same thickness. Next, the cable conductors are aligned with the board terminals and the cable and board mechanically clamped together. Finally, solder joint is hopefully formed between each conductor and its associated connector board mating area by heating the entire assembly sufficiently to remelt the solder coatings.

The above-described and commonly employed prior art technique has been extremely time consuming and produced poor results wherein either or both open circuits (cold joints) or short circuits between adjacent conductors resulted. Further, the results of the prior art joining technique were, from an appearance standpoint, poor and very nonuniform.

To summarize the disadvantages of the prior art, it has previously been necessary to solder coat both the cable and the areas on the connector board to which the cable is to be joined. Both in achieving the solder coating and in ultimately joining the cable and board, a long heating time is required since all materials and assembly fixtures must be heated to the soldering temperature. Due, in part, to the long heating time, the resulting solder joints are mechanically weak and electrically poor due to oxidation which occurs during the heating operation. Also, since reflowing of the solder to form the joints is accomplished under pressure and with the assembly in an oven, solder tends to squeeze out from between the cable conductors and connector board terminals and to form short circuits between adjacent conductors.

SUMMARY OF THE INVENTION

The present invention overcomes the foregoing and other disadvantages of the prior art and in so doing provides a method of rapidly soldering multiconductor cables to connector boards which gives reliable electrical and mechanical joints of uniform appearance. In accordance with the present invention, insulation is stripped from one side of one end of the cables as in the prior art. Thereafter, the stripped end of the cable is partially folded back on itself to provide a cable end having exposed conductors on both sides. The cable is thereafter aligned with the connector board and secured thereto with an adhesive. Finally, the joined area is fluxed and the assembly is thereafter passed through the solder wave of a commercial wave soldering machine. During the soldering operation, solder wicks up between the cable and board conductors and also forms a fillet of solder at the end of the cable thereby resulting in a substantial increase in both the mechanical strength and electrical integrity of the resulting joint.

BRIEF DESCRIPTION OF THE DRAWING

The present invention may be better understood and its numerous objects and advantages will become apparent to those skilled in the art by reference to the accompanying drawing wherein like reference numerals refer to like elements in the various FIGS. and in which.

DESCRIPTION OF THE PREFERRED EMBODIMENT

Figures 1, 2, 3, 4, 5, 6, 7:
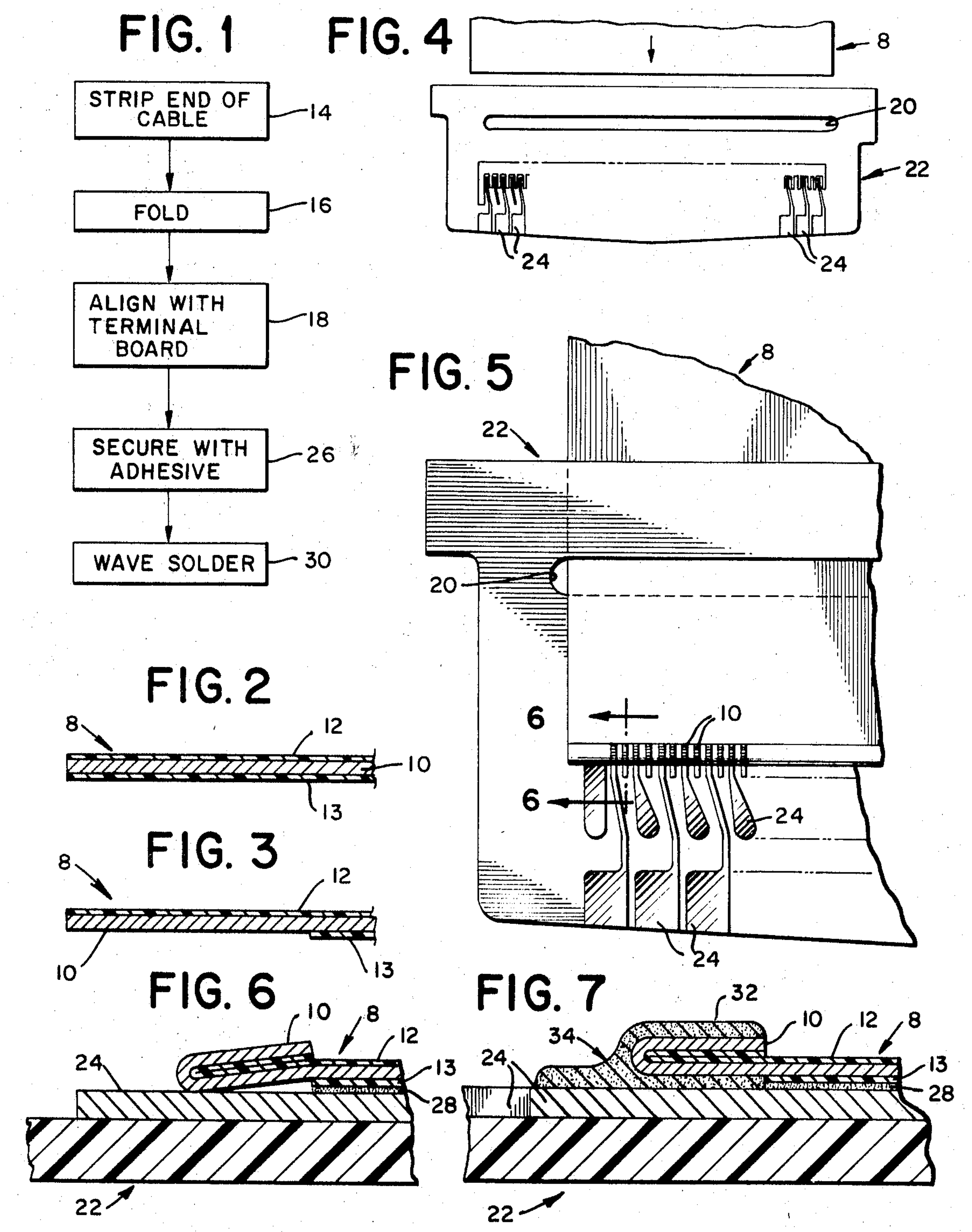
FIG. 1 is a flow diagram depicting the various steps performed in accordance with the present invention.
FIG. 2 is a partial cross-sectional end view of a multiconductor, flat flexible printed circuit cable as will be employed in the practice of the present invention.
FIG. 3 depicts the end result of the step of stripping insulation from one side of one end of the cable of FIG. 2.
FIG. 4 is a top view representing a cable and connector board prior to their being joined in accordance with the present invention.
FIG. 5 is a partial top view of the cable and connector board of FIG. 4 subsequent to mating but prior to forming the solder joints therebetween.
FIG. 6 is a cross-sectional view, taken along line 6–6 of FIG. 5, of the assembly of the present invention prior to soldering.
FIG. 7 is an enlarged cross-sectional view showing the structure of FIG. 6 subsequent to the soldering operation.

With reference now to FIG. 2, a flat flexible cable, indicated generally at 8, suitable for use in accordance with the present invention is shown in cross section. The cable of FIG. 2 comprises a plurality of aligned copper conductors, such as conductor 10, which are encapsulated by being sandwiched between films or strips of insulating material 12 and 13. Electrical members having a plurality of spaced thin metallic conductors supported and insulated by films of flexible insulating material, and suitable for use in accordance with the present invention, are described in U.S. Pat. No. 3,391,246 which issued to J. H. Freeman et al. on Jul. 2, 1968. Methods for preparing such electrical members are described in aforesaid U.S. Pat. No. 3,391,246 and also in copending application Ser. No. 728,856 of E. Traynor et al. and assigned to the same assignee as the present invention.

In accordance with the first step performed in the practice of the present invention, as indicated in 14 in FIG. 1, the insulation is stripped from one side of one end of flexible cable 8 to expose the ends of conductors 10. Stripping of the insulation to expose bare conductors on one surface of the cable may be accomplished mechanically or chemically depending upon the nature of the insulating film 12. If the insulating film is comprised of an aromatic polyimide resin as disclosed in the aforementioned patent and copending application, the insulation may be stripped chemically in accordance with the technique of U.S. Pat. No. 3,331,718, issued Jul. 18, 1967 by Charles R. Ruffing and assigned to the assignee of the present invention. Typically, the conductors will be exposed for a length of 0.100 inches to produce the result shown in cross section in FIG. 3.

The next step in accordance with the present invention comprises folding the stripped end of cable 8 back on itself, as indicated in step 16. Typically, the conductors will be bent back on themselves approximately 0.030 inches from the end thus providing exposed conductors on both sides of the cable as may be seen from FIG. 6.

After the stripped end of the cable has been folded back on itself, the cable is aligned with the connector board as indicated in step 18. Referring to FIG. 4, the cable 8 is passed through a slot 20 provided therefor in a rigid connector board 22 and the exposed conductors 10 are brought into contact with their respective conductor terminations, such as termination 24, on the connector board. The result of this alignment step may best be seen from simultaneous consideration of FIG. 5 and 6.

After alignment of the cable conductors and the board terminations, the cable is secured, as indicated at step 26, to connector board 22 by means of an adhesive 28 (FIG. 7). In the case of a cable comprised of an aromatic polyimide or polyamide-polyimide resin, adhesive 28 may be an epoxy resin. In order to securely attach the cable to the board, and to prevent creep during subsequent operations, the adhesive will be cured by application of heat and pressure.

With cable 8 fastened securely to connector board 22 means of the adhesive, the joint area or areas will be fluxed and the assembly thereafter passed through the solder wave of a commercial wave solder machine in step 30. The resultant of the wave soldering step is shown in FIG. 7 wherein the solder is indicated at 32. A typical commercial wave soldering apparatus which produces standing waves of flux and molten solder is disclosed in U.S. Pat. No. 3,386,166 to L. V. Tardoskegyi. Since the solder wicks up between the conductive portions of the connector board and cable, a substantial increase in both the mechanical and electrical integrity of the resulting joint will result. This mechanical and electrical integrity is further enhanced by the formation of a solder fillet, as indicated at 34, between the conductor and surface of the connector board (terminal pads).

To summarize the advantages of the present invention, solder coating of either or both the cable and the connector board is not required. Similarly, neither mechanical clamping of the cable to the board nor baking the assembly in an oven to cause solder reflowing are required. Accordingly, the method of the present invention produces the requisite connections considerably faster and thus substantially more economically than has previously been possible. The structure resulting from the present invention has electrical joints with uniformly low resistance. Due to solder wicking and the formation of the fillet, these joints are also considerably stronger from a mechanical standpoint than those resulting from prior art techniques. Since reflowing of solder while subjecting the assembly to pressure is not required, the formation of short circuits between adjacent cable conductors, a problem which has plagued the prior art, has been substantially obviated.

In a typical example, the cable 8 comprised etched conductors formed through application of procedures standard in the printed circuit art. The conductors were fabricated from 2 oz. copper supported on a flexible polyamide-imide film 13. The film was "Duroid 8150" available from Rogers Corporation, Rogers, Conn. The covering film 12 was 1 mil "Kapton," a polyimide polymer available from E. I. du Pont de Nemours Co. The adhesive 28 was a bondable fluorinated ethylene propylene, known in the art as FEP, and was applied as a one-half inch lateral strip in 5 mil thickness. The connector board 22 was comprised of a flame retardant glass-epoxy material. The terminals 24 on the connector board were gold coated.

While a preferred embodiment has been shown and described, various modification and substitutions may be made thereto, without departing from the spirit and scope of the present invention. Accordingly, it is to be understood that the present invention has been described by way of illustration and not limitation.

We claim:

1. A terminated printed circuit comprising:

a flat flexible printed circuit having a plurality of conductors extending to one edge thereof, said conductors being substantially parallel adjacent said one edge and being exposed on one side along a first length extending from said one edge, said circuit being folded on itself intermediate said first length to provide first and second layers of exposed conductive material;

a rigid connector board having a plurality of conductive portions on one side thereof, said conductive portions being aligned with said first layer of exposed conductive material on said one side of said circuit and said second layer of conductive material being spaced from said board outwardly of said first layer;

means attaching said circuit to said board along a second length of said circuit, said second length being disposed inwardly from said one edge and said first length; and means electrically connecting said board conductive portions and said exposed portions of said circuit conductors.

2. The article of claim 1 wherein said electrical connecting means comprises: solder joining said conductors and portions, said solder being disposed between said conductors and portions and covering the folded over portion of said conductors.

3. The article of claim 2 wherein said solder forms a fillet about the exposed conductors where said circuit is folded.

4. The article of claim 3 wherein said attaching means comprises: means adhesively bonding said circuit to said board along a strip parallel to said one edge.

5. The article of claim 1 wherein said attaching means comprises: means adhesively bonding said circuit to said board along a strip parallel to said one edge.

6. A method for electrically and mechanically joining a flexible cable to a rigid connector, said cable comprising at least one conductor having substantially flat surfaces encapsulated by insulating material and said connector comprising a rigid insulator having at least a first conductive termination on a surface thereof, said method comprising the sequential steps of:

removing the insulation from one surface of said cable conductor along a first length adjacent a first end of said cable;

folding the cable back on itself intermediate said first length to present said exposed side of said conductor on both sides of the cable;

aligning said exposed conductor portion which is in the plane of said cable conductor with said connector termination;

affixing said cable to said connector in a region displaced from said first cable length; and soldering said exposed cable conductor to said connector termination.

7. The method of claim 6 wherein said step of soldering comprises: passing said folded portion of said cable conductor through a wave of molten solder.

8. The method of claim 7 wherein said step of affixing the cable to the connector comprises: adhesively bonding said cable to said connector along a strip displaced inwardly on said cable from said first length.

9. The method of claim 8 wherein the step of adhesively bonding comprises:

disposing a strip of adhesive between said cable and connector; and curing said adhesive through the application of heat and pressure.

10. The method of claim 6 wherein said step of affixing the cable to the connector comprises: adhesively bonding said cable to said connector along a strip displaced inwardly on said cable from said first length.